United States Patent [19]

Genev et al.

[11] 4,226,207

[45] Oct. 7, 1980

[54] APPARATUS FOR APPLYING PROTECTIVE COATINGS TO GRAPHITE BODIES

[75] Inventors: Ivan V. Genev; Mihail Konstantinov; Alexander Valchev; Vassil Peev, all of Sofia, Bulgaria

[73] Assignee: DSO "Cherna Metalurgia", Sofia, Bulgaria

[21] Appl. No.: 922,491

[22] Filed: Jul. 6, 1978

Related U.S. Application Data

[63] Continuation-in-part of Ser. No. 760,504, Jan. 19, 1977, abandoned.

[51] Int. Cl.$^2$ .............................................. B05C 5/00
[52] U.S. Cl. .................................. 118/620; 118/314; 118/321; 118/500; 427/37; 427/113
[58] Field of Search ............... 118/500, 314, 321, 503, 118/47, 620; 198/624, 786; 427/113, 37

[56] References Cited

U.S. PATENT DOCUMENTS

| | | | |
|---|---|---|---|
| 2,592,275 | 4/1952 | Grosvenor | 198/624 |
| 2,597,930 | 5/1952 | Grosvenor | 198/786 |
| 2,683,436 | 7/1954 | Marantz | 118/320 |
| 2,716,180 | 8/1955 | Dubilier | 118/47 |
| 3,076,429 | 2/1963 | Sprague | 118/314 |
| 3,091,435 | 5/1963 | Pease | 118/418 X |
| 3,348,929 | 10/1967 | Valtschev et al. | 427/113 |
| 3,379,803 | 4/1968 | Tittmann et al. | 118/718 X |
| 3,743,124 | 7/1973 | Jaruis | 118/320 X |
| 3,886,892 | 6/1975 | Walls | 118/318 X |
| 3,951,103 | 4/1976 | Hinchcliffe et al. | 118/321 X |

Primary Examiner—Shrive P. Beck
Attorney, Agent, or Firm—Karl F. Ross

[57] ABSTRACT

In an apparatus for coating cylindrical graphite bodies, a pair of shafts are arranged in a closely spaced apart relationship with their respective axes lying close to the horizontal in respective parallel planes and slightly tilted in opposite directions in those planes, so that the shafts cross one another with none of their surfaces being parallel and form between them a guideway for a graphite body to be coated, the rotation of the shafts in the same sense causing the body to advance to a coating station arranged alongside the shafts and electrodes positioned above the guideway to form a coating-bonding electric arc with the body, which is supplied current through the shafts. The rotation of the shafts is reversible for advancing the graphite body back and forth past the coating station for the application of multilayered coatings.

11 Claims, 7 Drawing Figures

APPARATUS FOR APPLYING PROTECTIVE COATINGS TO GRAPHITE BODIES

CROSS REFERENCE TO RELATED APPLICATION

This application is a continuation-in-part of our copending application Ser. No. 760,504, filed Jan. 19, 1977 now abandoned.

FIELD OF THE INVENTION

This invention relates, in general, to devices for applying a protective coating to graphite bodies and, more particularly, to a device for applying multilayered protective coatings on cylindrical graphite bodies to be used as electrodes.

BACKGROUND OF THE INVENTION

Graphite bodies which are to be used as electrodes generally require a protective coating of an electrically conductive metal or metal oxide to prevent the rapid erosion of the graphite body by an electric arc. It has been found that, rather than a thick coating of a single metal, several relatively thin coatings of different metals or other substances applied to the graphite body afford better protection thereof.

Devices for producing coated graphite bodies are known and usually comprise a machine having a base on which is provided a turret for rotatably supporting the graphite body to be coated. Also provided on the base is a carriage movable in a longitudinal direction alongside the rotating body and carrying the coating tools and an electrode for forming an electric arc with the graphite body which will bond the coating thereto, the carriage being further provided with a trailing cable which supplies the electric current, air and water needed on the carriage for performing the coating operations.

If the coating applied to the body is to be of even thickness, or a specific thickness, the relative movement between the rotating body and longitudinally advancing carriage must be carried out in a perfect sequence, which makes the known devices of this kind extremely complicated.

Another disadvantage of present coating machines is that if the coating is to be multilayered, the graphite workpiece must be moved to a different machine for each layer applied, so that the body must be repositioned by being clamped and unclamped in each of the turret mountings, causing delays in the coating operation, further compounded by the carriages having to return to a starting position without performing any work.

OBJECTS OF THE INVENTION

It is, therefore, an object of the present invention to provide a coating device which can perform a multilayered coating and bonding operation on a single machine.

It is another object of the present invention to provide a coating machine in which the workpiece does not have to be carefully positioned and clamped.

It is still a further object of the present invention to provide a coating machine in which there is no coordinated movement between the workpiece and another moving part.

And it is yet another object of the invention to provide a coating machine which can perform the coating operations automatically.

SUMMARY OF THE INVENTION

The above and other objects of the invention are attained in a coating apparatus in which a pair of shafts are arranged in a closely spaced apart relationship with their respective axes lying close to the horizontal in respective parallel planes and slightly tilted in oposite directions in those planes, so that the shafts cross one another at angles less than 30°, with none of their surfaces being parallel.

The shafts are journaled at their ends and can be rotatably driven individually or together in either direction but always in the same sense relative to each other, each shaft being driven at only one end, opposite from each other. The undriven ends of the shafts are journaled in jacks for adjusting the tilt angle of the shafts about a pivot formed at the driven ends.

Alongside the shafts there is provided a stationary support upon which several coating tools are arranged, one for each layer of coating. On either side of the support, above the shafts, there is provided an electrode connected to a source of arc current.

When a cylindrical graphite body to be coated is placed on the guidetrack formed by the shafts and the shafts are rotated, the workpiece is advanced along the shafts at a rate determined by the tilt angle, past the battery of coating tools where it receives its first layer of coating. As the workpiece advances beyond the coating tools, it passes beneath the electrode on that side of the support, where an electric arc can be formed between the workpiece, which is energized by current fed to the shafts through slip rings provided thereon, and the electrode, the arc generating heat which bonds the coating to the graphite body. After the workpiece advances completely beyond the electrode, the shafts reverse their direction of rotation and the workpiece is advanced in the opposite direction, past the battery of coating tools where it receives another layer of coating and then passes beneath the electrode on the other side of the support, where, once again, an arc can be formed to bond this second layer to the workpiece, the coating bonding operation being repeated as many times as is necessary to form a final coating of the desired thickness. It should also be pointed out that the individual layers need not necessarily be bonded individually after each application, but can be bonded after the final layer is applied.

Generally, the shafts are operated at a constant rate of rotation, the rate of advancement of the workpiece being controlled by the tilt angle between the shafts, which is adjustable to compensate for different diameter workpieces in order to maintain a standard rate of advancement most advantageous to the coating operation.

In a preferred embodiment of the invention, the shafts are cylindrical, so that the rate of advancement of the workpiece is constant, with the workpiece making line contact with one shaft and point contact with the other shaft. If the shafts cross one another somewhere within their length, the workpiece will shift position as it passes the crossover point of the shafts and make line contact with the shaft it had previously been making point contact with and point contact with the shaft it had previously been making line contact with.

In other embodiments of the invention, the shafts can be of conical, hyperboloidal or bambinoidal form, causing the advancement of the workpiece to vary over the length of the shaft, which could be advantageous in certain types of coating operations.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
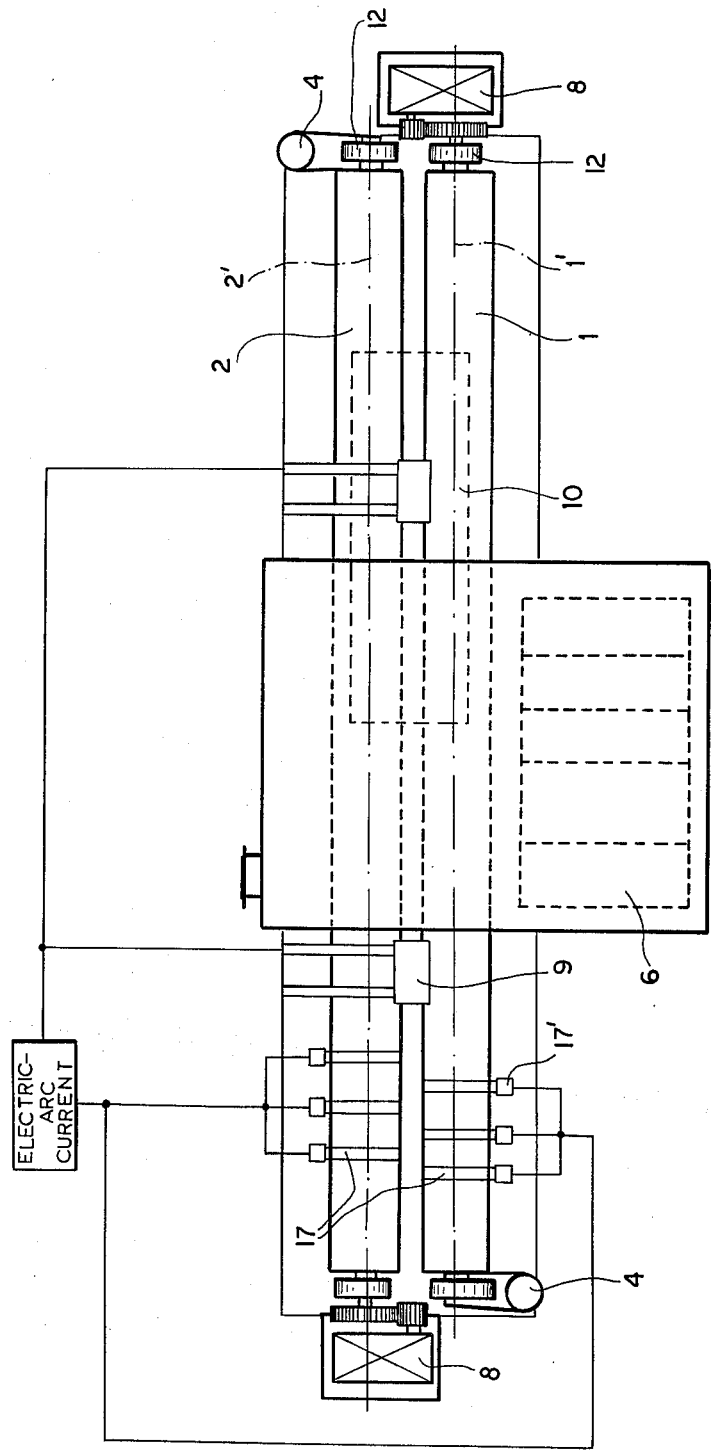
FIG. 1 is a top view of the device according to the invention.
Figure 2:
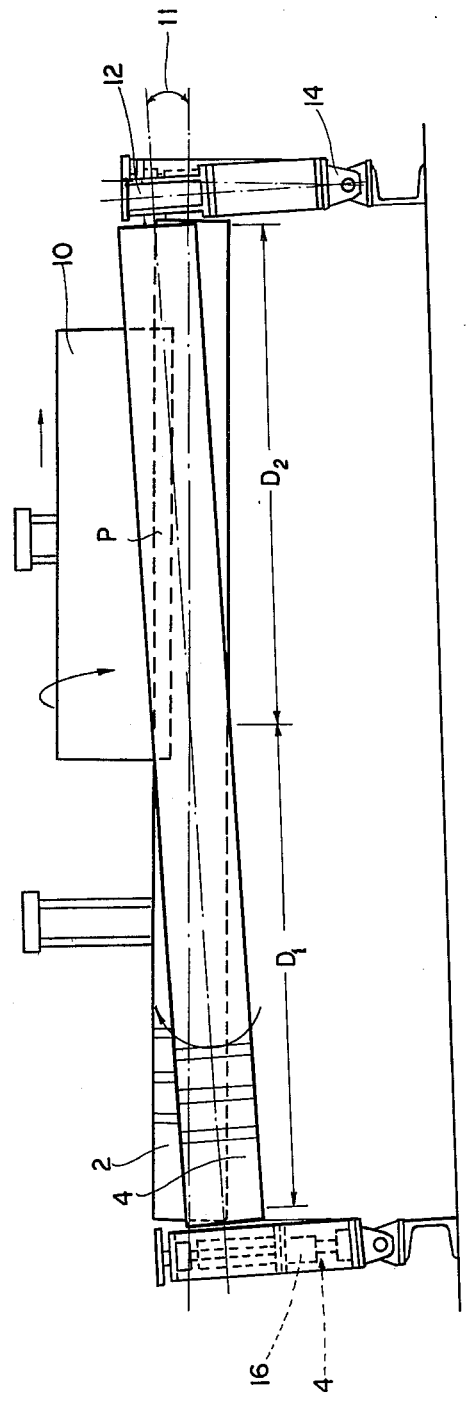
FIG. 2 is a side view of the device of FIG. 1 with parts removed.
Figure 3:
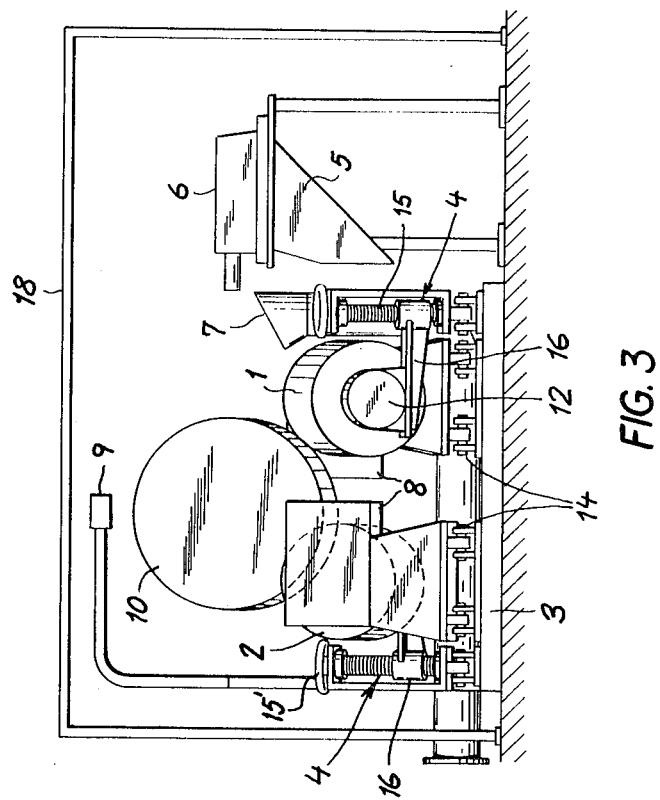
FIG. 3 is an end view of the device of FIG. 1.

In FIGS. 1–3, a pair of cylindrical shafts 1 and 2 are shown arranged in a closely spaced apart relationship with their axes 1' and 2' lying close to the horizontal in respective parallel planes and slightly tilted in opposite directions in those planes, so that the shafts 1 and 2 cross one another at angles of less than 30°, as shown at 11 in FIG. 2, with none of their surfaces being parallel with respect to each other.

The shafts 1 and 2 are journaled in bearings 12 and rotated by driving units 8 at opposite ends of these shafts. The other ends of shafts 1 and 2 are engaged by jacks 4 comprising a screw 15 driven by a handle 15' or other means not shown, and a nut 16 riding on screw 15 and formed with an arm 16' carrying a bearing 12. The jacks 4 tilt the shafts 1 and 2 in opposite directions about pivots 14, mounted on a base 3, as are the jacks 4, the pivots 14 carrying drive units 8.

Approximately midway between the ends of shafts 1 and 2, alongside the shaft 1 is a support 5 which carries a battery of coating tools 6, which can be raised or lowered or moved toward or away from a workpiece 10 being advanced along the guideway formed by the slight separation between the shafts 1 and 2.

The coating tools and shafts are covered by a hood 18 provided with an exhaust duct 7 for removing any dust formed by the coating operation.

Immediately on either side of the hood 18, there is provided an electrode 9, positioned above the guideway and adjustable to a height sufficient to clear an advancing workpiece 10 and establish therewith an electric arc, current being supplied to the workpiece through shafts 1 and 2 formed with slip rings 17 in contact with brushes 17', which are fed by electric-arc current supply 19, as are electrodes 9.

Figure 4:
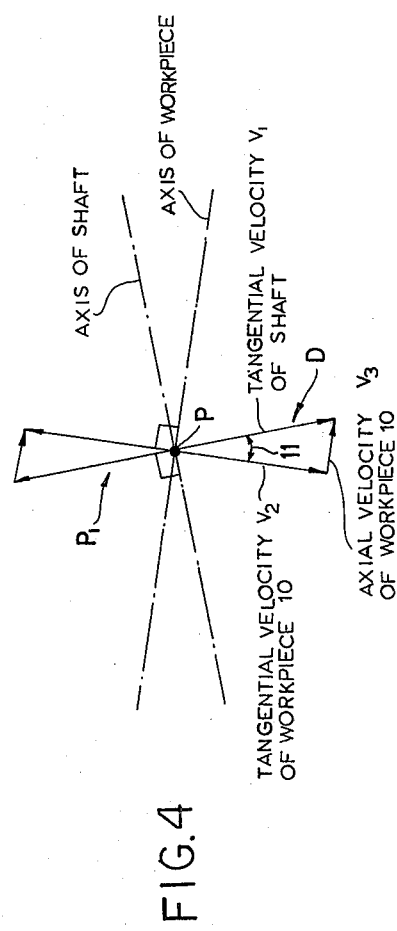
FIG. 4 is an idealized diagram of the forces acting on the workpiece of FIG. 1.

As can be seen in FIG. 2, where the hood 18 has been removed for clarity, a workpiece 10 placed at the left-hand end of the shafts 1 and 2 advances to the right, riding in line contact with shaft 1 and in point contact with shaft 2 over a distance $D_1$, where, at the crossover point of the shafts, the workpiece 10 shifts position and rides in line contact with shaft 2 and point contact with shaft 1, the point contact being represented at P, where the rotational forces acting on the workpiece concentrate, causing the workpiece to rotate and advance along the shafts. As can be seen in FIG. 4, the tangential velocity $V_1$ of shaft 1 at the point P imparts a tangential velocity $V_2$, offset from $V_1$ by the angle 11, to the workpiece 10, the resultant of the two velocities $V_1$ and $V_2$ being an axial velocity $V_3$ imparted to the workpiece 10.

Figure 5:
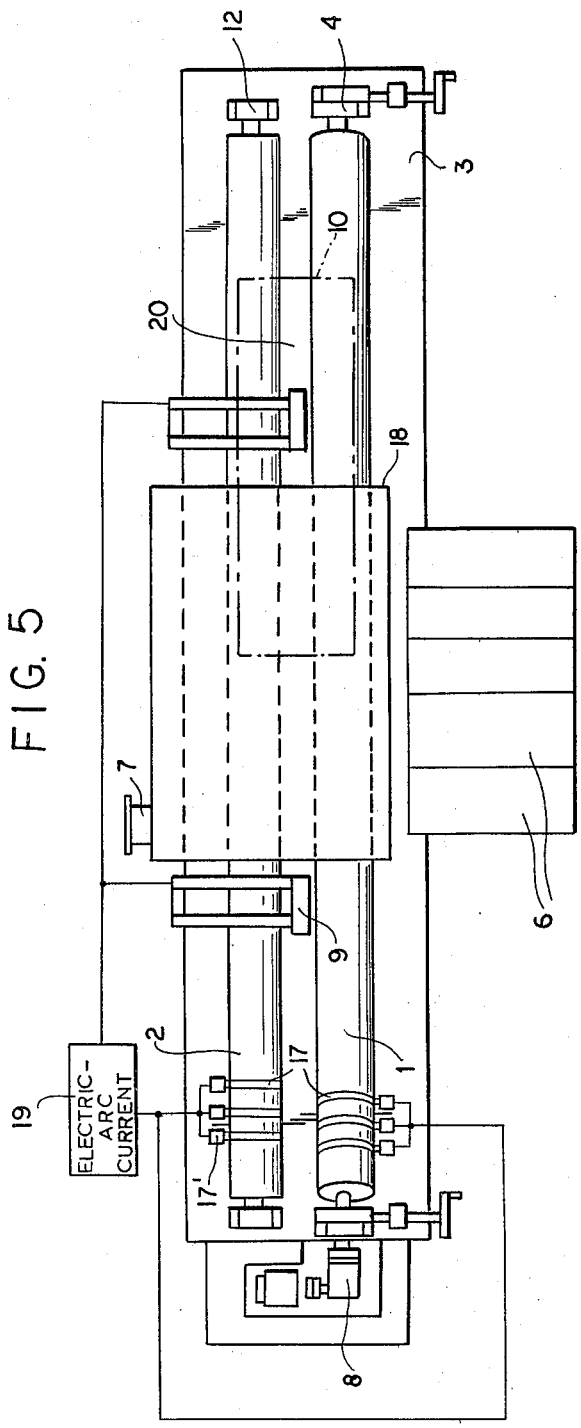
FIG. 5 is a top view of another embodiment of the invention.
Figure 7:
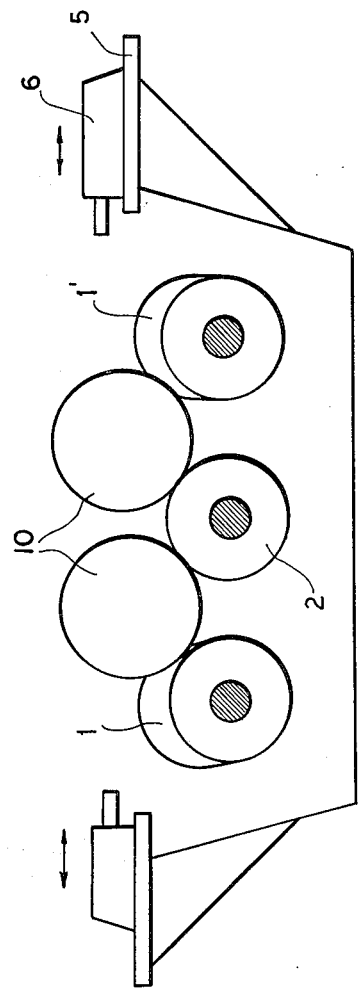
FIG. 7 is a sectional view of a further embodiment of the invention.
Figure 6:
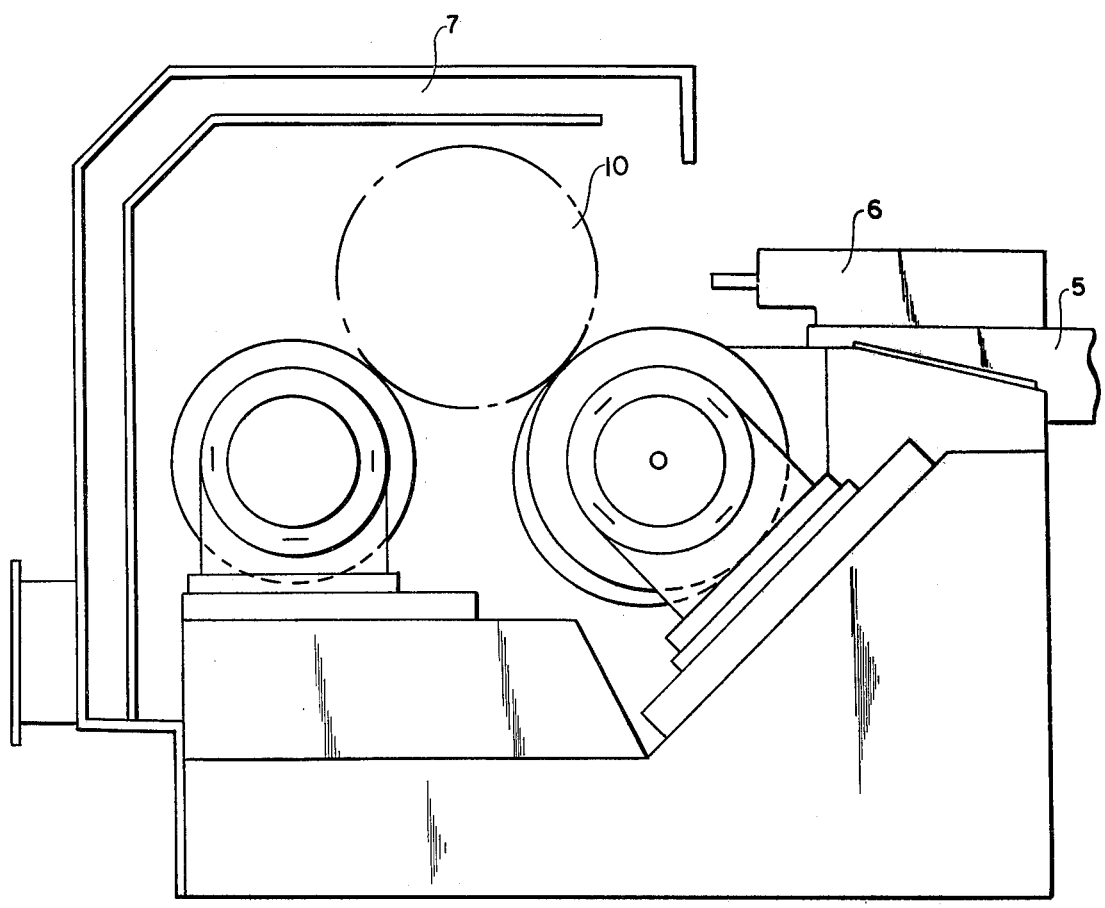
FIG. 6 is an end view of the embodiment shown in FIG. 5.

In the embodiments of FIGS. 5–7, similar elements to those of FIGS. 1–3 have been given the same numbers, as can be seen in FIGS. 5 and 6, where the shafts 1 and 2 are arranged the same as in FIGS. 1–3 with the difference in that shaft 2 lies in a fixed horizontal position journaled in bearings 12 while the adjustment of the tilt angle between them is provided by the jacks 4 at each end of shaft 1, which is also rotated by the driving unit 8, provided at one end thereof. In this embodiment, the shaft 1 only is driven, so that the rotation of shaft 2 is imparted by the rotation of workpiece 10 by shaft 1.

The hood 18, in this embodiment, overlies the shafts only and not the battery of coating tools 6, and is provided with an exhaust duct 7 for removing the dust produced in the coating operation. Immediately on either side of hood 18, positioned above the guideway 20, are the electrodes 9, fed from the current supply 19, as are the slip rings 17 through the brushes 17'.

In the embodiment of FIG. 7, three shafts are shown, capable of carrying two workpieces at the same time. A center shaft 2 is journaled in a horizontal position the same as in FIG. 5 and is flanked on either side by shafts 1 and 1' having adjustable tilt angles. In all other respects, the other elements of this embodiment are similar to those in the other embodiments.

In operation, a cylindrical graphite workpiece to be coated is placed at either end of the shafts and the shafts rotated. The direction of rotation depends on which end the workpiece is placed, the direction being reversible but always in the same sense relative to one another.

The workpiece 10 is advanced past the battery of coating tools 6 where it receives a first coating of a multilayer coating to be applied. As the workpiece advances beyond the tools 6 it passes beneath one of the electrodes 9 where an arc is formed by current fed from the current supply 19 to the electrode 9 and to the slip rings 17 formed in the shafts 1 and 2 and conducted thereby to the workpiece 10, the arc serving to heat the coating and bond it to the workpiece. After the workpiece 10 clears the electrode 9, the rotation of the shafts is reversed and the workpiece is advanced back in the other direction, beneath the electrode 9, which is now deenergized, and past the battery of coating tools 6, where it receives another layer of coating and passes beneath the other electrode 9 where an arc is again formed to bond this new layer. This back and forth operation can continue until as many layers of coating are deposited as is desired.

It should be pointed out that the different layers of coating are of a different kind of conductive metal which has been liquified for application to the workpiece 10 and that the bonding of each individual layer need not be performed, the bonding taking place only after the last layer is applied, the whole coating being bonded at one time.

It should be further pointed out that since all operations take place on one machine, the operation of that machine can be easily automated.

In a typical application of the invention, the embodiment shown in FIGS. 1–3 would have a shaft length of 8000 mm and a shaft diameter of 320 mm, with the slip rings in a cylindrical form having a diameter of 350 mm.

With the small tilt angles at which the machine usually operates, up to a maximum of 1°, the stability of the movement of the workpiece is excellent.

At greater tilt angles up to 1°30′, the shafts used are of either conical, hyperboloidal or bambinoidal form, which give a greater central advancement speed to the workpiece and maintain the stability thereof better at larger working tilt angles.

We claim:

1. An apparatus for applying protective coatings to cylindrical graphite bodies, comprising:
   a base;
   a first shaft rotatable about a first axis and mounted on said base;
   a second shaft rotatable about a second axis and mounted on said base in a closely spaced-apart relationship with said first shaft and forming a first guideway therebetween for said graphite bodies, said first axis and said second axis lying in respective parallel planes;
   variable-length means between said base and an end of at least one of said shafts for displacement of said axis thereof within said respective plane thereof to form a variable angle of less than 30° with said axis of said other shaft;
   reversible driving means on at least one of said shafts for the reversible rotation thereof and the reciprocal displacement thereby along said guideway of said bodies;
   a battery of coating tools adjacent said guideway intermediate the ends of said shafts for applying said coating to said bodies;
   a pair of electrodes respectively positioned above said guideway to either side of said battery of coating tools at locations fixed along said axes;
   slip rings formed on at least one of said shafts; and
   an electric-arc current supply connected to said electrodes and said slip rings for leading current to the electrodes.

2. The apparatus as defined in claim 1, further comprising:
   a hood overlying said shafts and said battery of coating tools;
   exhaust means in said hood for removing dust during the coating of said graphite bodies; and
   means for displacing said battery of coating tools up and down and toward and away from said graphite bodies.

3. The apparatus as defined in claim 1, wherein both of said shafts are provided with variable-length means for the displacement thereof.

4. The apparatus as defined in claim 3, wherein both of said shafts are provided with driving means for the reversible rotation thereof in the same sense.

5. The apparatus as defined in claim 1, further comprising a third shaft rotatable about a third axis and mounted on said base in a closely spaced apart relationship with said second shaft and forming a second guideway therebetween for said graphite bodies, said third axis and said second axis lying in respective parallel planes.

6. The apparatus defined in claim 1 wherein said battery of tools is provided midway between the ends of said shafts.

7. The apparatus defined in claim 6 wherein said battery of tools extends over at most one-third of the lengths of said shafts.

8. The apparatus defined in claim 7 wherein said angle is at most 1.5°.

9. The apparatus defined in claim 8 wherein said angle is at most 1.0°.

10. The apparatus defined in claim 9 wherein said angle is between 0.3° and 0.9°.

11. The apparatus defined in claim 1 wherein at least one of said shafts has a configuration of a cylinder, cone, hyperboloid or bambinoid.

* * * * *